(12) United States Patent
Seland

(10) Patent No.: US 6,910,786 B1
(45) Date of Patent: Jun. 28, 2005

(54) LIGHTING DEVICE FOR INSTALLATION IN PLANE SURFACE

(75) Inventor: Henrik Seland, Oslo (NO)

(73) Assignee: Advanced Light AS, Oslo (NO)

(*) Notice: Subject to any disclaimer, the term of this patent is extended or adjusted under 35 U.S.C. 154(b) by 433 days.

(21) Appl. No.: 10/177,030

(22) PCT Filed: Dec. 20, 2000

(86) PCT No.: PCT/NO00/00436

§ 371 (c)(1),
(2), (4) Date: Aug. 27, 2002

(87) PCT Pub. No.: WO01/46012

PCT Pub. Date: Jun. 28, 2001

(30) Foreign Application Priority Data

Dec. 22, 1999 (NO) ..................................... 996408

(51) Int. Cl.$^7$ ............................................. F21V 17/00
(52) U.S. Cl. ...................... 362/364; 362/339; 362/244; 362/153.1; 362/267
(58) Field of Search ............................ 362/153.1, 364, 362/244, 339, 375, 267

(56) References Cited

U.S. PATENT DOCUMENTS

| | | | |
|---|---|---|---|
| 3,999,054 A | 12/1976 | Dorman | 362/364 |
| 4,396,972 A | 8/1983 | Kaneko et al. | 362/145 |
| 4,860,182 A | 8/1989 | Vadseth | 362/299 |
| 4,912,610 A * | 3/1990 | Dahlberg | 362/153.1 |
| 5,335,151 A * | 8/1994 | Dahlberg | 362/153.1 |
| 5,813,744 A * | 9/1998 | Altebarmakian | 362/470 |
| 6,033,083 A * | 3/2000 | Reinert, Sr. | 362/153.1 |

FOREIGN PATENT DOCUMENTS

| | | |
|---|---|---|
| DE | 1 183 455 | 4/1962 |
| DE | 29 25 842 A1 | 6/1979 |
| WO | WO 97/44611 | 5/1997 |
| WO | WO 01/46012 A1 | 12/2000 |

* cited by examiner

Primary Examiner—Stephen Husar
Assistant Examiner—Ali Alavi
(74) Attorney, Agent, or Firm—Sierra Patent Group, Ltd.

(57) ABSTRACT

The invention relates to a lighting device for installation in a substantially plane surface, for example, the surface of a runway. The lighting device comprises at least one lamp unit that emits light essentially in a light direction which forms an angle α with an axis at right angles to the substantially plane surface. Furthermore, the lighting device comprises at least one light refracting means having a longitudinal direction coincident with the light direction, an incident face substantially at right angles to the light direction, and an exit face parallel to the substantially plane surface. The light refracting means is preferably a prism grating. The lighting means is characterised in that the light refracting means is supported by a supporting means that extends along the whole of or a substantial part of the length of the light refracting means, and which preferably envelops the side faces of the light refracting means.

31 Claims, 3 Drawing Sheets

LIGHTING DEVICE FOR INSTALLATION IN PLANE SURFACE

PRIOR APPLICATIONS

This application claims priority to Norway Application number 1999 6408 filed Dec. 22, 1999 and PCT/NO00/00436 filed on Dec. 20, 2000.

BACKGROUND

The invention relates to a lighting device for installation in a substantially plane surface.

Lighting devices of the aforementioned type are particularly useful in airports, and especially for use as marking of the correct path for incoming aircraft or aircraft taxiing on the runway, or to make centre lines or limits visible to the pilots.

A number of lighting devices for installation in a plane surface, and in particular for use in airports, are previously known. A device of the type mentioned above is taught in U.S. Pat. No. 4,860,182. This device comprises a prism holder for installation in a plane, preferably horizontal surface, and in particular in a runway. The prism holder has two orifices in its upper surface. A light refracting means in the form of a prism grating is arranged in each orifice. Each prism grating consists of parallel glass discs having a common longitudinal direction and of uniform thickness that are bonded adhesively to one another.

The prism gratings preferably consist of borosilicate glass, and a metal foil may be placed between each disc. Each prism grating is secured in place in the prism holder by means of an adhesive.

Positioned in the lower part of the prism holder are two angle-set light sources, each having a reflector arranged to emit light in rays that are essentially parallel in a principal direction. Each light source and reflector is inclined in such a manner that the principal direction of the light source is parallel to the common longitudinal direction of the parallel discs in the associated prism grating. The inclination, expressed as the angle that the principal direction of the light sources forms with a vertical axis, is said to be 45°.

The end of the prism grating that faces the corresponding light source forms an incident face that is essentially at right angles to the principal direction of the light sources. The incident face may be plane, convex or concave. In the first-mentioned case, the parallel light beams from a light source fall essentially perpendicular to the plane incident face or plane of incidence. The prism grating also has a plane exit face, which is parallel to the surface in which the device is to be located. The light in the prism grating strikes the plane of reflection at an angle that is not a right angle. Therefore, the light will be refracted so that it is transmitted at an angle of reflection determined by the refraction properties of the prism grating and the aforementioned angle of 45°.

When installed and used in a runway, the prism holder is inserted into a recess in the runway, with a resilient layer between the bottom of the recess and the prism holder. The top face of the prism holder has projections on either side of each of the prism grating orifices. The height of the projections corresponds to the thickness of the resilient layer. If a sufficiently large force is exerted on the top face of the prism holder, for example, by an aircraft passing with one wheel directly on the prism holder, the layer will yield elastically so that the prism holder temporarily moves slightly downwards in the recess.

A first disadvantage of this known device is that the projections in use form irregularities or bumps for passing aircraft and other vehicles. In particular, the projections are an obstacle for snow clearing in the winter season.

A second disadvantage of the known device consists of the weaknesses associated with the elastic flexibility of the prism holder in the vertical direction. This flexibility causes operational problems over time, due in part to the fact that the properties of resilient layer between the bottom of the recess and the prism holder may alter after a certain period of use. The properties are affected by temperature variations, water/moisture and other environmental factors. Furthermore, the flexibility can be inhibited over time, or an undesired flexibility in other directions may develop because of the ingress of foreign elements, or because of structural changes in the recess in the surface in which the device is installed.

The first and second disadvantages are both related to the fact that each prism grating in the known device withstands only a highly limited impact force from above. This is due to the fact that the prism grating is secured in place in the prism holder by means of an adhesive without any appreciable support against a lower supporting structure. Thus, one of the purposes of the elastic flexibility in the vertical direction is to prevent damage to or loosening of the prism gratings.

A third disadvantage of the known device is that there are difficulties in gaining access to the internal components, for example, when changing lamps or carrying out other maintenance operations.

A fourth disadvantage of the known device is that there are difficulties in removing or replacing the prism gratings as they are permanently bonded to the prism holder by means of adhesive.

A fifth disadvantage of the known device is that the light sources are not utilized in a sufficiently effective manner, as each light source is placed at a relatively great distance from the end of the associated prism grating facing the light source.

A sixth disadvantage of the known device is that the disclosed angle of 45° between the principal direction of the light source and a vertical axis does not give an optimum angle of reflection to ensure desired visibility from certain distances from the device and heights above the plane in which the device is to be installed.

A seventh disadvantage of the known device is that the prism holder and the prism gratings form a relatively large hollow space, where temperature gradients and temperature changes can cause condensation.

An eighth disadvantage of the known device is that the useful life of the light sources is shorter than desired, which is due in part to the fact that the heat generated by the light sources is not conducted away in a satisfactory manner, and causes a higher operating temperature than the optimum.

SUMMARY

The object of the present invention is to provide a lighting device of the type mentioned in the introduction, and which remedies or overcomes at least some of the aforementioned disadvantages, and preferably all of them.

A lighting device in accordance with the invention can be made having a completely flat outer surface, so as to avoid projections or irregularities that are a nuisance to passing aircraft and other vehicles, and which especially form an obstacle during snow-clearing in the winter season.

A lighting device in accordance with the invention obviates the need for elastic flexibility in the vertical direction. This is due to the fact that the structure, equipped with a supporting means that supports the prism grating, provides considerably greater strength and load capacity. The device will be capable of withstanding repeated, direct stresses from, for example, passing aircraft wheels, without the prism gratings being damaged or loosened. The fact that the device does not have any movable parts means that it has greater long-term operational reliability and durability, under varying and at times extreme environmental conditions.

The structure according to a preferred embodiment, with a light source and associated reflector housed in a casing, fastened to a preferably integrated structure of flange, supporting and fastening means, makes for easier operations in connection with the changing of light sources or other maintenance work which requires access to the internal components of the device.

By virtue of this structure, the light source has also been moved closer to the prism grating, which gives better utilization of the light from the light source. Furthermore, the space around the lamp unit and its associated parts is minimized, which reduces problems of condensation associated with temperature gradients and temperature changes.

The structure according to one embodiment with a seal between the prism grating and the supporting means, especially in combination with the metal foil layer on the side faces of the prism grating, simplifies the operation of removing or changing the prism grating.

An inclination corresponding to an angle α between the main axis of the light source and an axis vertical to the plane in which the lighting device is installed, where the angle α has a value of about 40° to about 44°, preferably from about 41° to about 43°, and most preferably approximately 42°, optimises the direction of emergence of the light with a view to ensuring desired visibility from an aircraft on the ground, from a particular distance and height above the plane in which the device is to be installed.

The lamp units are preferably housed in a casing in direct, metallic, thermally conducting contact with the supporting and flange means, which in turn is in metallic, thermally conducting contact with a cover. This allows good heat dissipation to a large, integral metal face, which in turn has a contact face against the external surroundings. The improved heat dissipation from the lamp units results in a lower operating temperature and a longer life for the light sources.

BRIEF DESCRIPTION OF THE DRAWINGS

The invention will now be described in more detail, with reference to the attached drawings wherein.

DETAILED DESCRIPTION

Figure 1:
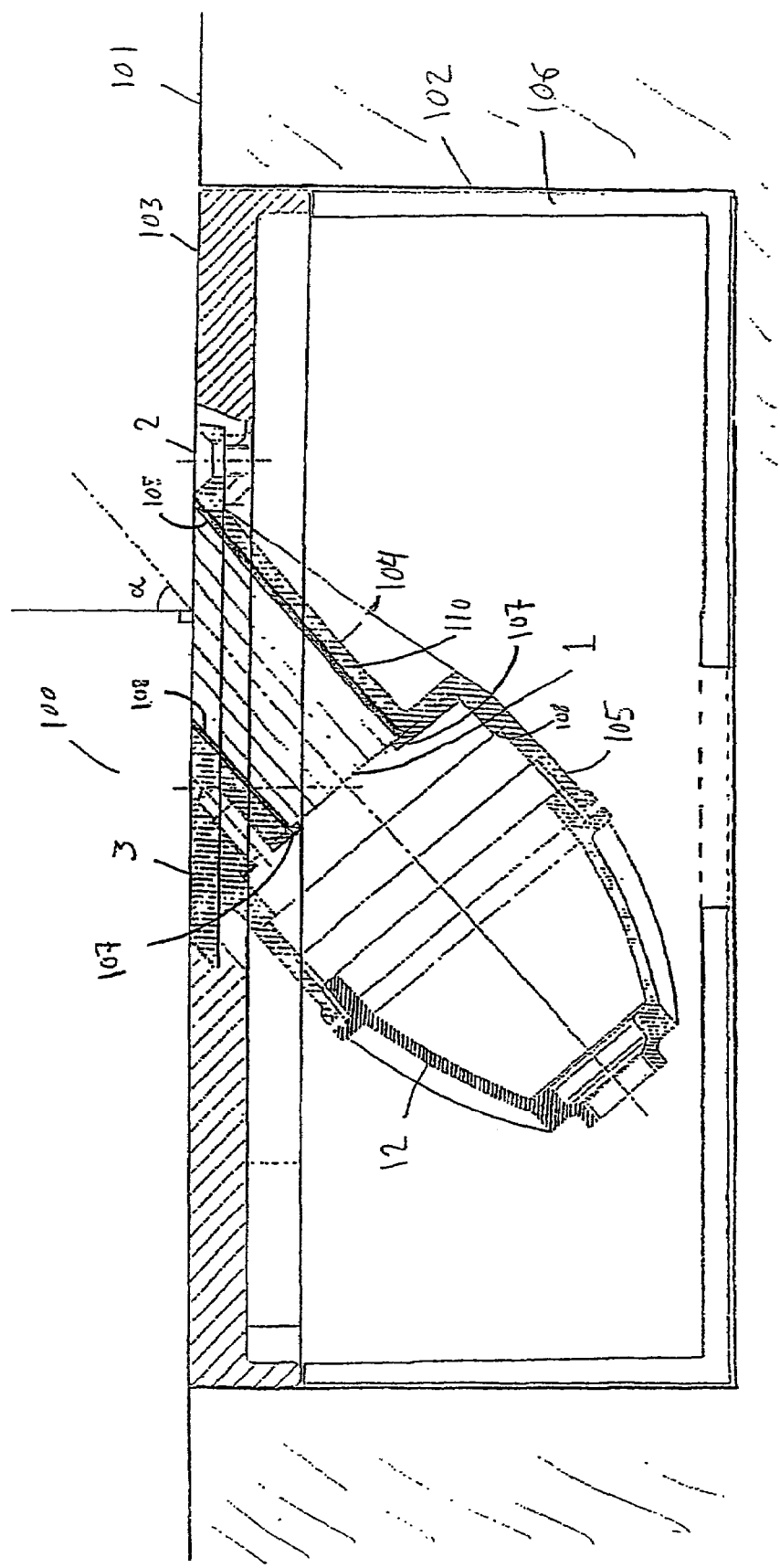
FIG. 1 is a lateral section of an exemplary lighting device.
Figure 2:
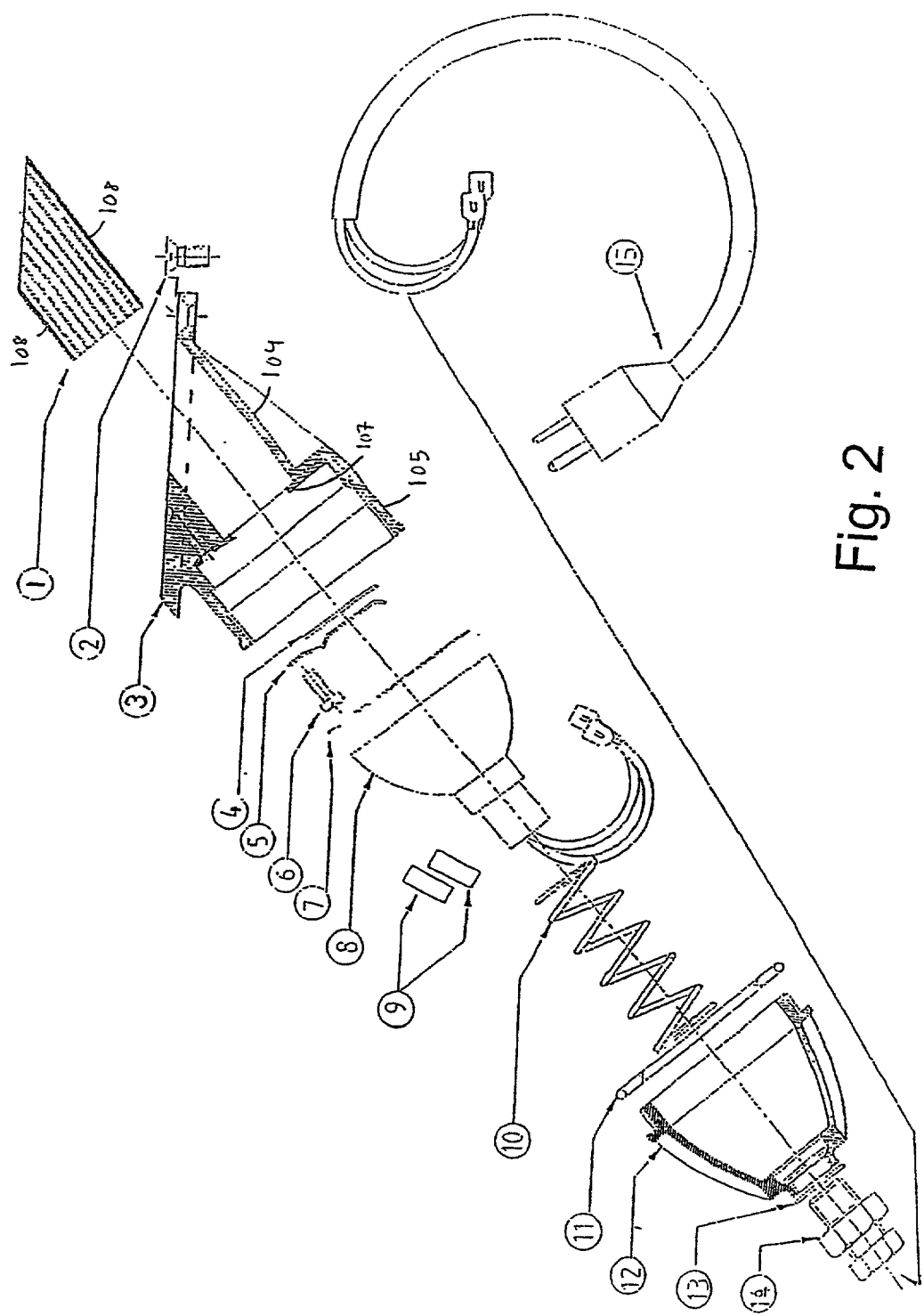
FIG. 2 is an exploded side view of an exemplary lighting device.

The lighting device illustrated in FIG. 1, and in more detail as an exploded view in FIG. 2, is intended to be installed in a substantially plane surface 101, for example, the surface of a runway at an airport. The lighting device shown in FIGS. 1 and 2 comprises just one lamp unit 8 and one light refracting means in the form of a prism grating 1.

A recess 102 is made in the surface 101. A base structure 106 in the form of a cylindrical well is placed in the recess 102. At its upper edge, the well is covered by a cover 103. The cover may be fastened to the well with the aid of a plurality of sunken screws (not shown), preferably two, through the cover and into threaded holes (not shown) in the well. A seal (not shown) may be provided between the well and the cover. The well is positioned at such a depth that the top face of the cover 103 lies in the same plane as the surface 101. The bottom of the well has at least one opening towards the ground below, for, inter alia, drainage purposes.

The cover 103 has an opening for sunken installation of a flange means 3. The flange means is secured to the cover by means of at least one fixing screw 2 through a hole in the flange means 3. Alternatively, the flange means 3 can be secured in another way, at the option of the skilled person, but preferably in such manner that the top face of the flange means lies in the same plane as the top face of the cover 103 and the surface 101. A seal (not shown) may be provided between the flange means and the cover.

The flange means 3 comprises a supporting means 104. In the illustrated, preferred embodiment, the supporting means 104 is made as an integral part of the flange means 3, the two being made, preferably cast, in one piece. Alternatively, the flange means 3 and the supporting means 104 can be separate parts that are held together by means of screws or similar temporary fasteners, or they can be originally separate parts that are permanently joined by welding, soldering or similar known, permanent joining means.

The cover 103, the well 106, the flange means 3 and the supporting means 104 consist of a material having high thermal conductivity, good mechanical strength, strong resistance against outdoor environmental impacts, including temperature fluctuations, water and chemical compositions that may be found at airports and on roads. The material must also have a suitable workability for manufacture. Preferably, a metal material is used, most preferably an aluminium alloy, or alternatively cast iron or other iron alloys.

The supporting means 104 encloses and supports a light refracting means, which preferably consist of a prism grating 1.

The prism grating 1 is of a type similar to that described in U.S. Pat. No. 4,860,182, inasmuch as consists of a glass material in the form of parallel disks 112 having a common longitudinal direction. The discs preferably consist of borosilicate glass.

Placed between each pair of adjacent discs 112 is a thin layer of metal foil 113, preferably a copper alloy, or another metal having good thermal conduction and good light reflecting properties.

A prism grating of this kind has a good capacity for directional light transmission in the longitudinal direction of the prism grating, parallel to the discs.

The outsides of the longitudinal sides of the prism grating 1, called the side faces, may preferably be covered by a metal foil of the same type. It is particularly advantageous to cover the two side faces that are parallel to the glass discs with a metal foil of this kind.

The last-mentioned feature involves both an improvement in the directional light transmission of the prism grating and also an advantage during the mechanical finishing of the prism grating 1. This applies in particular in connection with bevel cutting where a sharp edge is provided along an outermost glass disc in the prism grating. A metal foil placed on such an outer side wall reduces the danger of damage to the outermost glass disc in the area around an edge of this kind.

Metal foil on these side faces is not known from the prism grating in U.S. Pat. No. 4,860,182.

The discs and the pieces of foil are adhesively bonded to one another.

The prism grating 1 has an incident face that is preferably plane and at right angles to the longitudinal direction of the prism grating, so that incident light in the longitudinal direction of the prism grating does not change direction as a result of refraction at the incident face. A design of this kind is particularly suitable if it is desired that a concentrated, parallel light should be emitted from the lighting device.

Alternatively, the incident face may be curved or concave, so that incident light in the longitudinal direction of the prism grating results in the light beams being refracted at the incident face and scattered, essentially in a plane parallel to the discs in the prism grating. A design of this kind is particularly suitable if it is desired that scattered light should be emitted from the lighting device. A seal 108 is preferably provided between the prism grating and the supporting means. The seal 108 consists of a robust material having elastic properties, preferably a rubber material, and most preferably silicone rubber. In one embodiment, the seal 108 is a silicone rubber layer, cast in place, that envelops all the side faces of the prism grating. On the outsides this seal 108 is provided with parallel, salient grooves, not parallel to the longitudinal direction of the prism grating, and this enhances its fastening power to the supporting means 104.

With a seal 108 of this kind, the prism grating can be removed from the supporting means, and a new prism grating inserted in an easier manner than in the device previously known from U.S. Pat. No. 4,860,182. In the known device the prism grating is adhesively bonded to the prism holder. The prism grating 1 according to the invention can be removed and inserted with the aid of a hydraulic press apparatus, and this simplifies the operations involved with changing prism grating 1.

In the illustrated embodiment, the seal around the side faces of the prism grating is tightly enveloped by the supporting means 104. An essential aspect of the invention is that the supporting means 104, by means of a supporting face 110, supports the prism grating at it longest side face. This is accomplished by allowing the prism holder to extend along the whole of or a substantial part of the length of the prism grating. Here, the length of the prism grating should be understood to mean the longest of the side faces of the prism grating.

The supporting means 104 also advantageously comprises structured areas 107 that further support the prism grating, and which prevent the prism grating 1 from being pushed into the supporting means 104 as a result of an external force from the surface.

The configuration of the inclination of the supporting means 104 is a determining factor for the longitudinal direction of the prism grating 1. This inclination should be understood as the angle ax between the supporting face 110, identical to the longitudinal direction of the prism grating 1 and the direction of emitted light from the light source, and an axis at right angles to the surface 101.

The angle $\alpha$ is preferably from about 40° to about 44°, more preferably from about 41° to about 43°, and most preferably about 42°. This angle has been found to result in the optimum effect for use on airport runways, as the light emitted from the lighting device in this embodiment has been found to give desired visibility from an aircraft on the ground, at a particular distance from the device and a particular height above the plane in which the device is to be installed.

Against the incident face of the prism grating, i.e., the face that is closest to the light source and reflector, there is advantageously provided an optional colour filter 4, held in place by a retaining means 5 in the form of a filter spring, fastened to the supporting or flange means by at least one fixing screw. The retaining means 5 is preferably a wire spring, alternatively a leaf spring, made of an elastic material such as, for example, spring steel.

The colour filter 4 will affect the wave length range of the light emitted from the lighting device.

At its lower extension, the supporting means 104 is provided with a fastening means 105 for firmly securing a lamp unit 8. The fastening means consists of a cylinder whose axis is in the same direction as the inclination of the supporting means. The fastening means comprises internal threads at the end facing away from the flange means. These threads are arranged for the mounting of the casing 12 which has external, matching threads. The casing is designed, in a sealed manner to accommodate and hold the light source and associated reflector 8 in position. An O-ring 11 placed against an external collar on the casing 12 provides sealing between the casing 12 and the fastening means 105.

The fastening means 105 is preferably an integral part of the supporting means 104, and consists preferably of the same material as the supporting means and flange means. In an especially preferred embodiment, the fastening means 105 and the supporting means 104 are made, and preferably cast, in the same piece as the flange means 3. Alternatively, the supporting means 104 and the fastening means 105 can be separate parts that are held together by means of screws or similar temporary fasteners, or they may be originally separate parts that are permanently joined by welding, soldering or similar known joining means.

It is preferable that the lamp unit 8 should be made as a light source having an associated reflector and possibly cover glass. Suitable lamp units for the purpose are commercial reflector-halogen lamps, for example, of the mark Osram, with an output of 20 to 80 W, typically 35 W or 45 W, and with an operating voltage of typically between 6 and 24 V, for example, 12V. Optionally a lamp of the noble gas type, for example, a krypton lamp, may be used.

It is advantageous to provide a spacer ring 7 in front of the reflector or cover glass. During assembly, the spacer ring 7 will come into fixed, sealing contact with the lamp unit 8 on the one side and an internal rim 108 in the cylinder in the fastening means on the other side.

The lamp unit 8 has a base that is provided with a bipolar connection contact with wiring. A retaining spring 10 surrounds the base and the contact, and exerts a force on the lamp unit 8 which causes the lamp unit 8 to be pressed against and provide sealing against the rim 108.

The lamp unit 8 is connected electrically by means of a cable 15, which is passed through an ordinary cable lead-in 14 which, with the aid of an O-ring 13, provides sealing between the cable insulation and the casing. The cable lead-in 14 is preferably provided with external threads, adapted to internal threads at the extreme end of the casing 12.

Figure 3:
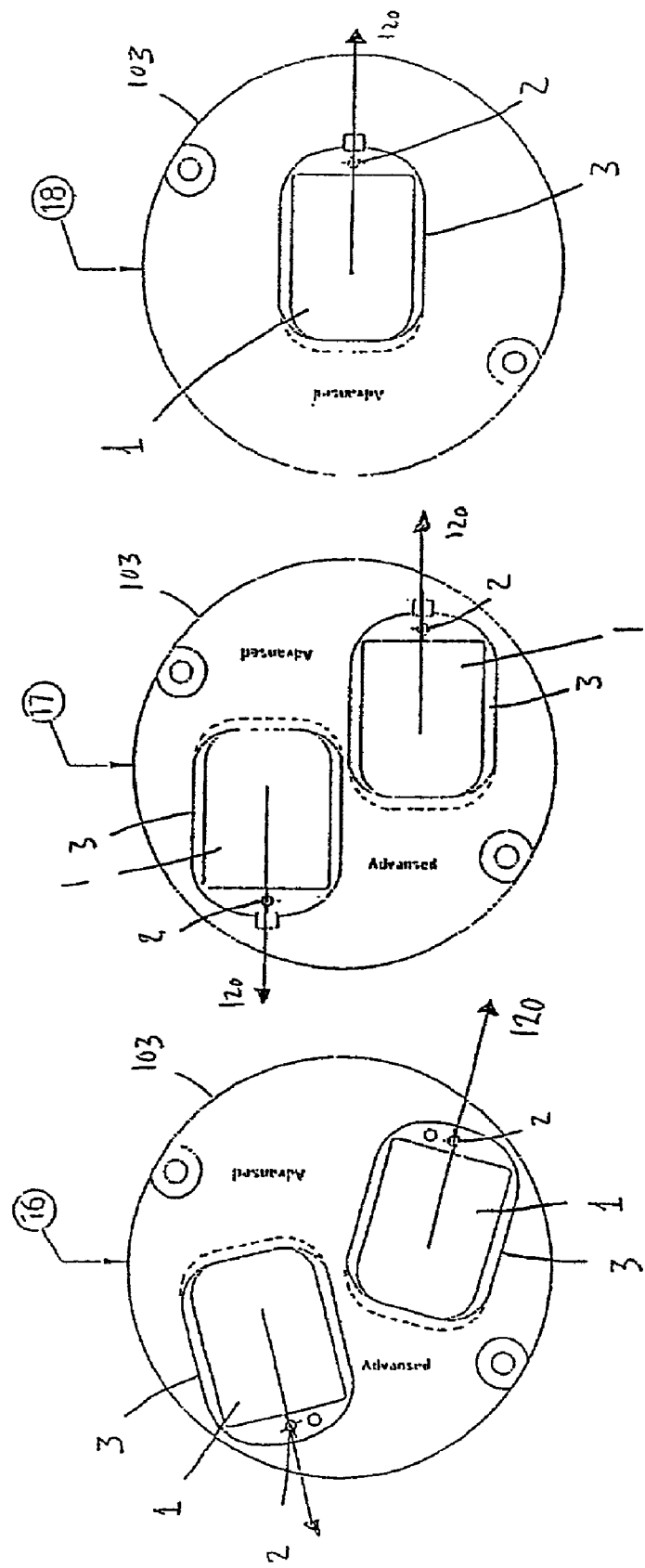
FIG. 3 shows three embodiments of an exemplary lighting device, seen from above.

FIG. 3 shows three embodiments 16, 17 and 18 of a lighting device 100 in accordance with the invention, viewed towards the surface in which the lighting devices are to be installed.

In the case of each embodiment there is illustrated a cover 103 and the surface of the flange means 3, fastened to the cover with fixing screws 2. The top face of the prism gratings 1 can be seen in openings in the flange means 3.

Whilst the cover 103 illustrated in FIGS. 1 and 2 comprises only one opening, and thus accommodates only one flange means and similarly one prism grating and one lamp unit, the cover 103 in one practical application could advantageously have two openings, so that two flange means can be provided, and similarly two prism gratings and two lamp units. The two light sources and prism gratings are preferably arranged having different directions 120, here understood as light directions projected on the substantially plane surface in which the lighting device is to be installed.

The direction 120 is determined by the design of the cover 103, or more precisely by the direction of each opening in the cover 103 that is arranged for mounting a flange means 3.

In the case of the lighting device 16, the cover is designed so that the directions 120 will be non-parallel.

In the lighting device 17, the directions 120 are parallel and opposite. The two directions of light emitted from the lighting device will then be mirror-symmetric about a plane at right angles to the surface 101 in which the device is to be installed, as with the arrangement taught in U.S. Pat. No. 4,860,182.

In the lighting device 18, the cover 103 has only one opening for mounting one flange means 103.

In the above description it has been stated that a lighting device in accordance with the invention can be used as marking lights on runways. However, it should be appreciated that the lighting device is suitable for installation in any substantially planar surface where there is a need for lighting directed from the surface at a given angle. Examples of alternative areas of use are thus the marking of lines/bends in roads for vehicular or pedestrian traffic, in tunnels, for lighting other objects such as, e.g., sculptures or similar pieces of art, for example, in town squares and parks.

The uses are not limited to situations where the substantially flat face is horizontal and where the light is directed in part upwards. Thus, the invention can be used for installation in walls, ceilings, roofs and in sloping faces. The invention nevertheless has special advantages in uses where there is a need to be able to physically load the part of the device that substantially lies level with the surface.

What is claimed is:

1. A lighting device for installation in a substantially plane surface comprising:
   at least one lamp unit that emits light essentially in specified light directions within specific angles of emission, which forms an angle with an axis at right angles to the substantially plane surface;
   a light refracting means in each of said at least one lamp unit, said light refracting means having a longitudinal direction coincident with said light direction, an incident face substantially at right angles to said light direction, and an exit face parallel to the substantially plane surface;
   said light refracting means is secured by a supporting means that extends along the whole length of the light refracting means;
   the light refracting means comprises a prism grating, consisting of discs of a glass material, preferably borosilicate glass, where between adjacent discs, and preferably on at least one of the side faces of the prism grating, there is provided a metal foil; and
   said angle is from about 41° to about 43°.

2. The lighting device according to claim 1 wherein said angle is about 42°.

3. The lighting device according to claim 1, wherein said supporting means consists of a flange means wherein said flange means, is designed upon installation to cover an opening in a cover that covers a base structure placed in a recess in the substantially plane surface.

4. The lighting device according to claim 1 wherein said supporting means is secured to a flange means wherein the flange means is designed upon installation to cover an opening in a cover that covers a base structure placed in a recess, the substantially plane surface.

5. The lighting device according to claim 3, wherein said lighting device comprises one lamp unit, one light refracting means, one flange means, one supporting means, wherein the flange means is designed upon installation to cover one of two openings in a cover that covers a base structure in the form of a cylindrical well, placed in a recess in the substantially plane surface.

6. The lighting device according to claim 1, wherein the light refracting means is further supported by means of a structural part of the supporting means that supports the incident face of the light refracting means.

7. The lighting device according to claim 2, wherein the light refracting means is further supported by means of a structural part of the supporting means that supports the incident face of the light refracting means.

8. The lighting device according to claim 3, wherein the light refracting means is further supported by means of a structural part of the supporting means that supports the incident face of the light refracting means.

9. The lighting device according to claim 4, wherein the light refracting means is further supported by means of a structural part of the supporting means that supports the incident face of the light refracting means.

10. The lighting device according to claim 5, wherein the light refracting means is further supported by means of a structural part of the supporting means that supports the incident face of the light refracting means.

11. The lighting device according to claim 1, wherein the light refracting means is tightly enveloped by the supporting means via an intermediate seal.

12. The lighting device according to claim 2, wherein the light refracting means is tightly enveloped by the supporting means via an intermediate seal.

13. The lighting device according to claim 3, wherein the light refracting means is tightly enveloped by the supporting means via an intermediate seal.

14. The lighting device according to claim 4, wherein the light refracting means is tightly enveloped by the supporting means via an intermediate seal.

15. The lighting device according to claim 5, wherein the light refracting means is tightly enveloped by the supporting means via an intermediate seal.

16. The lighting device according to claim 6, wherein the light refracting means is tightly enveloped by the supporting means via an intermediate seal.

17. The lighting device according to claim 1, wherein the supporting means comprises a fastening means for firmly fastening a casing that secures the light source and an associated reflector.

18. The lighting device according to claim 3, wherein the supporting means comprises a fastening means for firmly fastening a casing that secures the light source and an associated reflector.

19. The lighting device according to claim 3, wherein the supporting means comprises a fastening means for firmly fastening a casing that secures the light source and an associated reflector.

20. The lighting device according to claim 4, wherein the supporting means comprises a fastening means for firmly fastening a casing that secures the light source and an associated reflector.

21. The lighting device according to claim 5, wherein the supporting means comprises a fastening means for firmly fastening a casing that secures the light source and an associated reflector.

22. The lighting device according to claim 6, wherein the supporting means comprises a fastening means for firmly fastening a casing that secures the light source and an associated reflector.

23. The lighting device according to claim 11, wherein the supporting means comprises a fastening means for firmly fastening a casing that secures the light source and an associated reflector.

24. The lighting device according to claim 1, wherein the flange means has a plane surface.

25. The lighting device according to claim 2, wherein the flange means has a plane surface.

26. The lighting device according to claim 3, wherein the flange means has a plane surface.

27. The lighting device according to claim 4, wherein the flange means has a plane surface.

28. The lighting device according to claim 5, wherein the flange means has a plane surface.

29. The lighting device according to claim 6, wherein the flange means has a plane surface.

30. The lighting device according to claim 11, wherein the flange means has a plane surface.

31. The lighting device according to claim 17, wherein the flange means has a plane surface.

* * * * *